United States Patent
Araki et al.

(10) Patent No.: US 9,400,409 B2
(45) Date of Patent: Jul. 26, 2016

(54) LIQUID CRYSTAL DISPLAY

(71) Applicants: Shigesumi Araki, Hakusan (JP);
Norihisa Maeda, Nonoichi (JP);
Tatsuya Wakimoto, Hakusan (JP);
Kazuhiro Nishiyama, Kanazawa (JP)

(72) Inventors: Shigesumi Araki, Hakusan (JP);
Norihisa Maeda, Nonoichi (JP);
Tatsuya Wakimoto, Hakusan (JP);
Kazuhiro Nishiyama, Kanazawa (JP)

(73) Assignee: Japan Display Inc., Tokyo (JP)

( * ) Notice: Subject to any disclaimer, the term of this patent is extended or adjusted under 35 U.S.C. 154(b) by 635 days.

(21) Appl. No.: 13/669,867

(22) Filed: Nov. 6, 2012

(65) Prior Publication Data

US 2013/0113693 A1 May 9, 2013

(30) Foreign Application Priority Data

Nov. 7, 2011 (JP) .................................. 2011-243673

(51) Int. Cl.
*G02F 1/1343* (2006.01)
*G09G 3/36* (2006.01)
*G02F 1/1335* (2006.01)
*G02F 1/1362* (2006.01)

(52) U.S. Cl.
CPC .... *G02F 1/134363* (2013.01); *G02F 1/133512* (2013.01); *G02F 2001/136218* (2013.01); *G09G 3/3655* (2013.01); *G09G 2300/0426* (2013.01)

(58) Field of Classification Search
CPC .............. G02F 1/134363; G02F 2001/136218; G02F 1/133512; G09G 3/3655; G09G 2300/0426
USPC .......................................... 349/141, 106, 144
See application file for complete search history.

(56) References Cited

U.S. PATENT DOCUMENTS

| 6,356,331 | B1 * | 3/2002 | Ono ................. | G02F 1/134363 349/110 |
| 6,937,312 | B2 * | 8/2005 | Kadotani .......... | G02F 1/134363 345/100 |
| 8,810,764 | B2 * | 8/2014 | Nishida et al. ................. | 349/141 |

(Continued)

FOREIGN PATENT DOCUMENTS

| JP | 9-73101 A | 3/1997 |
| JP | 2002-116712 A | 4/2002 |

(Continued)

OTHER PUBLICATIONS

U.S. Appl. No. 13/705,370, filed Dec. 5, 2012, Maeda.

(Continued)

*Primary Examiner* — Hoan C Nguyen
(74) *Attorney, Agent, or Firm* — Oblon, McClelland, Maier & Neustadt, L.L.P.

(57) ABSTRACT

According to one embodiment, a display includes a first substrate including a scan line, a signal line, a pixel electrode including first electrodes extending substantially parallel to the signal line, a common electrode including second electrodes extending parallel to the first electrode between the first electrodes and arranged with a predetermined space between each second electrode and the adjacent first electrode, and a shielding portion at least arranged between the signal line and the first electrode arranged near the signal line, a second substrate including a light shielding layer having a width identical to a width of the shielding portion and arranged opposite the signal line, in a direction substantially orthogonal to the signal line, and a liquid crystal layer.

7 Claims, 4 Drawing Sheets

(56) References Cited

U.S. PATENT DOCUMENTS

| | | | |
|---|---|---|---|
| 8,871,590 B2 * | 10/2014 | Choi et al. ................ 438/268 |
| 8,873,008 B2 * | 10/2014 | Yamamoto et al. ........... 349/141 |
| 2002/0159016 A1 * | 10/2002 | Nishida ............ G02F 1/134363 |
| | | | 349/141 |
| 2005/0152230 A1 * | 7/2005 | Konno ............. G02F 1/134363 |
| | | | 369/1 |
| 2007/0216842 A1 * | 9/2007 | Kawasaki ............ G02F 1/1368 |
| | | | 349/141 |
| 2012/0327352 A1 | 12/2012 | Uyama et al. |

FOREIGN PATENT DOCUMENTS

| | | |
|---|---|---|
| JP | 2006-201814 | 8/2006 |
| JP | 2009-103925 A | 5/2009 |
| JP | 2010-8437 A | 1/2010 |

OTHER PUBLICATIONS

Office Action issued Jan. 14, 2014, in Japanese patent Application No. 2011-243673 with English translation.

U.S. Appl. No. 13/666,277, filed Nov. 1, 2012, Maeda, et al.

* cited by examiner

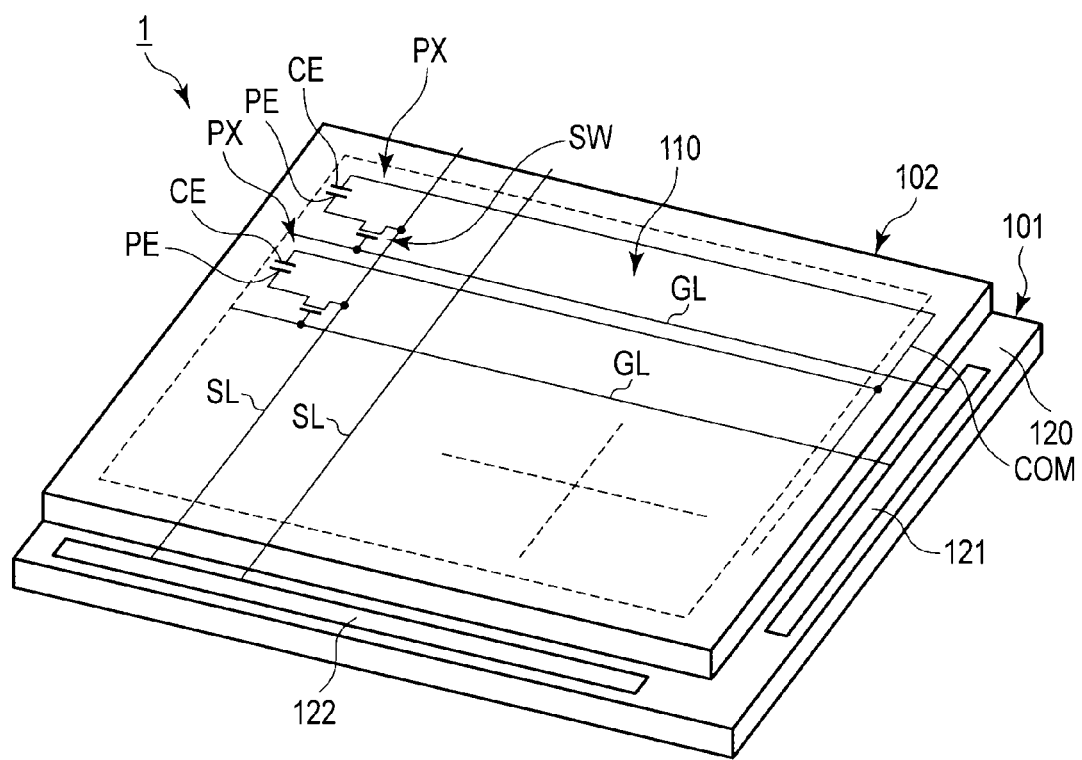
F I G. 1

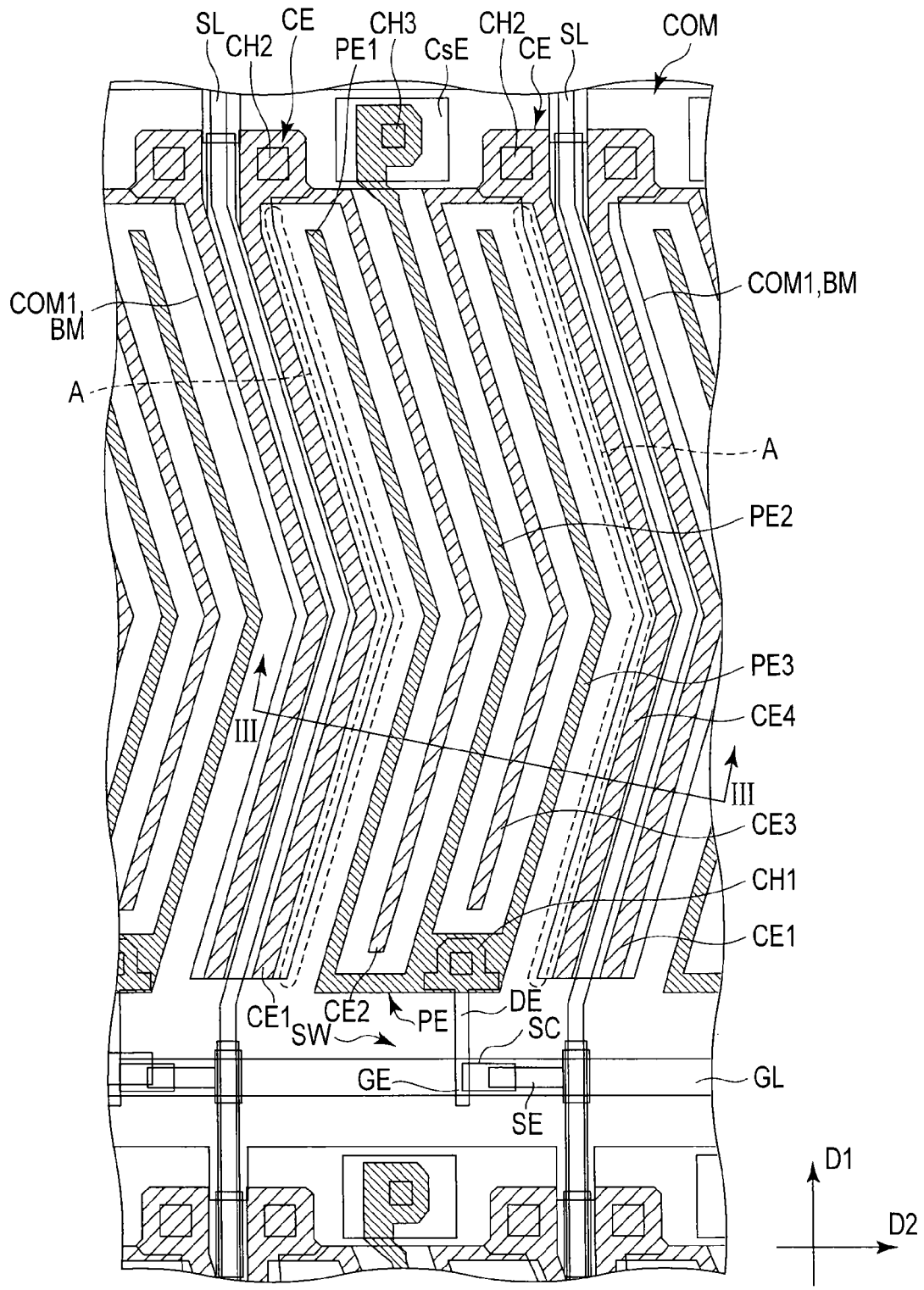
F I G. 2

LIQUID CRYSTAL DISPLAY

CROSS-REFERENCE TO RELATED APPLICATIONS

This application is based upon and claims the benefit of priority from Japanese Patent Application No. 2011-243673, filed Nov. 7, 2011, the entire contents of which are incorporated herein by reference.

FIELD

Embodiments described herein relate generally to a liquid crystal display.

BACKGROUND

In recent years, planar displays have been actively developed. In particular, liquid crystal displays have been applied to various fields by taking advantage of their characteristics such as reduced weight, reduced thickness, and reduced power consumption. A liquid crystal display holds a liquid crystal layer between a pair of substrates, and displays an image by using electric fields between pixel electrodes and common electrodes to control the modulation factor for light passing through the liquid crystal layer.

Liquid crystal displays are based on the following known schemes: a scheme of applying, to the liquid crystal layer, vertical electric fields acting substantially orthogonally to the surfaces of the pair of substrates to control the alignment state of the liquid crystals; and a scheme of applying, to the liquid crystal layer, lateral electric fields (including fringe fields) acting substantially parallel to the surfaces of the pair of substrates to control the alignment state of the liquid crystals.

Much attention has been paid to liquid crystal displays utilizing a lateral electric field in view of their ability to increase viewing angle. A liquid crystal display based on the lateral electric field scheme, such as in-plane switching (IPS) mode or a fringe field switching (FFS) mode, comprises pixel electrodes and common electrodes formed on a first substrate.

A liquid crystal display in the IPS mode includes pixel electrodes and common electrodes arranged at intervals in a direction substantially parallel to the substrate surface. Lateral electric fields produced between the pixel electrodes and the common electrodes are used to control the alignment state of liquid crystal molecules.

BRIEF DESCRIPTION OF THE DRAWINGS

FIG. 1 is a diagram schematically showing an example of a configuration of a liquid crystal display according to an embodiment;

FIG. 2 is a diagram schematically showing an example of a configuration of a display pixel in the liquid crystal display according to the embodiment;

DETAILED DESCRIPTION

Figure 3:
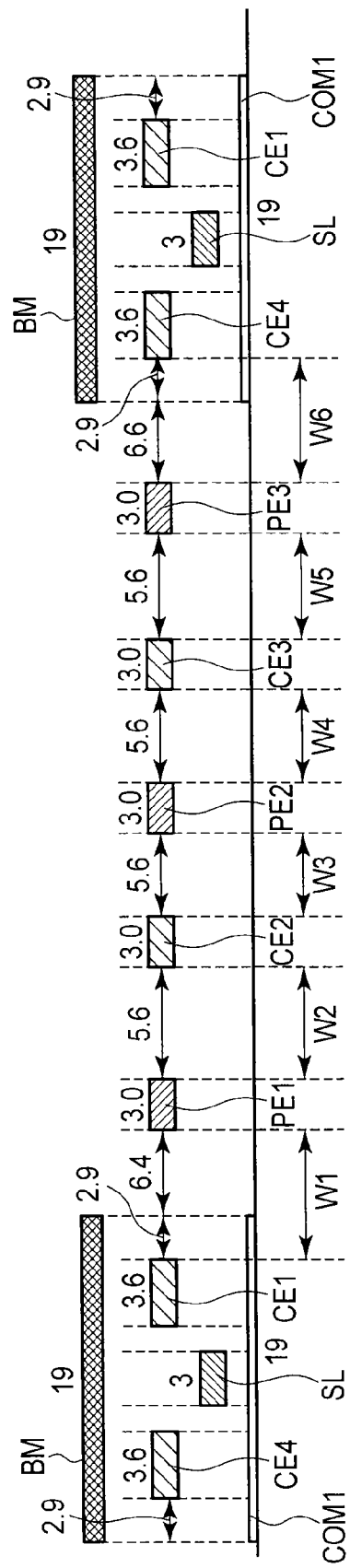
FIG. 3 is a diagram illustrating an example of a configuration of the display element in the liquid crystal display according to the embodiment.

In general, according to one embodiment, a liquid crystal display comprises a first substrate comprising a scan line, a signal line intersecting the scan line, a pixel electrode including a plurality of comb pixel electrodes extending in a direction in which the signal line extends and arranged in a direction in which the scan line extends, a common electrode including a plurality of comb common electrodes extending between the plurality of comb pixel electrodes in a direction in which the signal line extends and arranged with a predetermined space between each comb common electrode and the adjacent comb pixel electrode, and a shielding portion at least arranged between the signal line and the comb pixel electrode arranged near the signal line; a second substrate comprising a light shielding layer having a width identical to a width of the shielding portion and arranged opposite the signal line, in a direction substantially orthogonal to a direction in which the signal line extends; and a liquid crystal layer held between the first substrate and the second substrate.

A liquid crystal display according to an embodiment will be described below with reference to the drawings.

FIG. 1 schematically shows an example of a configuration of a liquid crystal display 1 according to a first embodiment. The liquid crystal display 1 according to the present embodiment is in a normally black IPS mode and comprises a pair of opposite substrates, that is, a first substrate 101 and a second substrate 102, a liquid crystal layer (not shown in the drawings) between the first substrate 101 and the second substrate 102, and a display section 110 including display pixels PX arranged in a matrix.

The first substrate 101 and the second substrate 102 are light transmissive insulating substrates, for example, glass substrates.

The first substrate 101 comprises, in the display section 110, a plurality of scan lines GL extending along a row direction (second direction) D2 in which the display pixels PX are arranged, a plurality of signal lines SL extending along a column direction (first direction) D1 in which the display pixels PX are arranged, pixel switches SW each arranged near an intersecting position between the corresponding scan line GL and signal line SL, a plurality of pixel electrodes PE arranged in each of the display pixels PX, and common electrodes CE each arranged so as to form a lateral electric field between the common electrode CE and the corresponding one of the plurality of pixel electrodes PE.

A gate driver 121 and a source driver 122 are arranged in an area around the display section 110. The plurality of scan lines GL extend into the area around the display section 110 and are connected to the gate driver 121. The plurality of signal lines SL extend into the area around the display section 110 and are connected to the source driver 122.

The gate driver 121 sequentially drives the plurality of scan lines GL so that a source and a drain of the pixel switch SW connected to each of the scan lines GL are made electrically continuous. The source driver 122 supplies video signals to the plurality of signal lines SL. The video signal supplied to the signal line SL is provided via the corresponding pixel switch to the pixel electrode PE. A common voltage is applied to the common electrodes CE via a common wiring line COM.

FIG. 2 shows a plan view illustrating an example of a configuration of the display pixel PX.

The signal lines SL and the scan lines GL extend so as to intersect. The pixel switch SW is a thin-film transistor including, for example, a semiconductor layer SC of amorphous silicon. The pixel switch SW may be a thin-film transistor including a semiconductor layer of polysilicon. A gate electrode GE of the pixel switch SW is electrically connected to the corresponding scan line GL (or integrated with the corresponding scan line GL). A source electrode SE of the pixel switch SW is electrically connected to the corresponding signal line SL (or integrated with the corresponding signal line SL). In the liquid crystal display 1 according to the present embodiment, the pixel switch SW comprises two source electrodes. A drain electrode DE of the pixel switch SW is connected to the corresponding pixel electrode PE via a contact hole CH1.

The electric connection between the pixel electrode PE and the corresponding signal line SL is switched by the pixel switch SW, the gate voltage of which is controlled by the scan line GL located on one side of the pixel electrode PE in a column direction D1. Furthermore, the pixel electrode PE is electrically connected, at a contact hole CH3, to an auxiliary capacitance electrode CsE located on the other side of the pixel electrode PE in the column direction D1.

The pixel electrode PE is formed like comb using a transparent electrode material such as indium tin oxide (ITO) or indium zinc oxide (IZO). The pixel electrode PE comprises a plurality of comb pixel electrodes PE1 to PE3 extending substantially parallel to the column direction D1 in which the display pixels PX are arranged. The plurality of comb pixel electrodes PE1 to PE3 are each bent in a substantially central portion thereof in a longitudinal direction of the display electrode PX (column direction D1) and thus extend in the form of ">".

The common electrode CE is formed like comb using a transparent electrode material such as ITO or IZO. The common electrode CE comprises a plurality of comb common electrodes CE1 to CE4 extending substantially parallel to column direction D1 in which the display pixels PX are arranged. The plurality of comb common electrodes CE1 to CE4 are each bent in a substantially central portion thereof in the longitudinal direction of the display electrode PX (column direction D1) and thus extend in the form of ">". The common electrode CE is electrically connected, at a contact hole CH2, to the common wiring line COM described below.

In FIG. 1, each of the signal lines SL is shown as a straight line. However, in the present embodiment, as shown in FIG. 2, the signal line SL extends so as to be bent in a substantially central portion thereof in the longitudinal direction of the pixel electrode PX, like comb pixel electrodes PE1 to PE3 of the pixel electrode PE and comb common electrodes CE1 to CE4 of the common electrode CE.

The common wiring line COM is arranged to extend through the same layer as that of the scan lines GL substantially parallel to a direction in which the scan lines GL extend (row direction D2). The common wiring line COM is electrically connected to the common electrodes CE arranged in the plurality of pixel electrodes arranged in the row direction D2. The common wiring line COM applies a common voltage to the common electrodes CE.

Furthermore, shielding portions COM1 are each arranged in a layer under the signal line SL and both comb common electrodes CE1 and CE4 arranged on the respective sides of the signal line SL. The same voltage as that of the common wiring line COM is applied to the shielding portion COM1. The shielding portion COM1 prevents light from passing through between the display pixels PX together with a light shielding layer BM in a second substrate 102 described below. The shielding portion COM1 blocks leakage electric fields from the signal line SL.

The auxiliary capacitance electrode CsE is arranged opposite the common wiring line COM. The auxiliary capacitance electrode CsE is arranged in the same layer as that of the signal lines SL. The auxiliary capacitance electrode CsE is electrically connected to comb pixel electrode PE2, one of the comb pixel electrodes of the pixel electrode PE, by contact hole CH3. An auxiliary capacitance Cs is formed between the auxiliary capacitance electrode CsE and the common wiring line COM.

Comb pixel electrodes PE1 to PE3 of the pixel electrode PE and comb common electrodes CE1 to CE3 of the common electrode CE are alternately arranged with a predetermined space between the electrodes in the row direction D2 in which the display pixels PX are placed (or in a direction substantially orthogonal to the signal lines SL).

The second substrate 102 comprises, in the display section 110, the light shielding layers BM arranged like a grid and opposite the signal lines SL and the scan lines GL, and a light shielding layer (not shown in the drawings) enclosing the displays section 110. Furthermore, if the liquid crystal display is of a color display type, the second substrate 102 comprises a color filter layer (not shown in the drawings).

The color filter layer comprises a red filter (not shown in the drawings) which allows light with a main wavelength corresponding to red light to pass, a green filter (not shown in the drawings) which allows light with a main wavelength corresponding to green light to pass, and a blue filter (not shown in the drawings) which allows light with a main wavelength corresponding to blue light to pass. Each of the color filters in the plurality of colors is arranged opposite one pixel electrode PE.

The first substrate 101 and the second substrate 102 comprise a pair of alignment films (not shown in the drawings) formed on the respective substrates and arranged opposite each other via the liquid crystal layer. The surface of the alignment film is subjected to an alignment process such as rubbing or optical alignment in a predetermined direction in order to regulate the initial alignment state of liquid crystal molecules contained in the liquid crystal layer. According to the present embodiment, the alignment process is carried out in a direction parallel to the first direction D1.

The alignment state of the liquid crystal layer is controlled by a lateral electric field produced by a potential difference between the video signal supplied to each of comb pixel electrodes PE1 to PE3 and the common voltage supplied to each of comb common electrodes CE1 to CE4.

FIG. 3 is a cross-sectional view illustrating an example of a configuration of the liquid crystal display 1 according to the present embodiment; the cross-sectional view is taken along line III-III in FIG. 2. Line III-III corresponds to a direction in which comb pixel electrodes PE1 to PE3 and comb common electrodes CE1 to CE4 extend. FIG. 3 shows the shielding portions COM1, comb pixel electrodes PE1 to PE3 of the pixel electrode PE, comb common electrodes CE1 to CE4 of the common electrode CE, the signal lines SL, and the light shielding layers BM. The other components are not shown in FIG. 3.

In a direction in which line extends, comb pixel electrodes PE1 to PE3 and comb common electrodes CE2 and CE3 are each about 3.0 µm wide. Comb common electrodes CE1 and CE4 arranged on the respective opposite sides of the signal line are each about 3.6 µm wide. The comb signal line SL is about 3.0 µm wide.

According to the present embodiment, in the direction in which line extends, the space width between adjacent ones of comb pixel electrodes PE1 to PE3 of the pixel electrode PE and comb common electrodes CE1 to CE4 of the common electrode CE varies between a central portion of the pixel and each end of the pixel.

In the direction in which line extends, space widths W1 and W6 between comb pixel electrodes PE1 and PE3 and comb common electrodes CE1 and CE4, respectively (said space widths being located near the signal line), are greater than space widths W2, W3, W4, and W5 between comb pixel electrodes PE1, PE2, and PE3 and comb common electrodes CE2 and CE3, respectively (said latter space widths being located in a central portion between the adjacent signal lines SL in the row direction D2).

Here, in the direction in which line III-III extends, the space widths between comb pixel electrodes PE1 and PE3 and comb common electrodes CE1 and CE4, respectively (said space widths being located near the signal line SL), are space width W6 between the first comb common electrode CE4 and the first comb pixel electrode PE3 from the signal line SL supplying video signals to the pixel electrodes PE via the pixel switches SW, and space width W1 between the fourth comb common electrode CE4 and the third comb pixel electrode PE3 from the same signal line SL.

That is, in a certain display pixel PX, the following are greater than space width W2 between comb pixel electrode PE1 and comb common electrode CE2, space width W3 between comb common electrode CE2 and comb pixel electrode PE2, space width W4 between comb pixel electrode PE2 and comb common electrode CE3, and space width W5 between comb common electrode CE3 and comb pixel electrode PE3: space width W1 between comb common electrode CE1 located next to the signal line SL supplying video signals to the pixel electrodes PE in the adjacent display pixel PX and comb pixel electrode PE1 located adjacent to comb common electrode CE1; and space width W6 between comb common electrode CE4 located next to the signal line SL supplying video signals to the pixel electrodes PE in the certain display pixel PX and comb pixel electrode PE3 located adjacent to comb common electrode CE4. Furthermore, space width W6 between comb pixel electrode PE3 and comb common electrode CE4 is greater than space width W1 between comb common electrode CE1 and comb pixel electrode PE1.

The width of the shielding portion COM1 is substantially the same as the width of the light shielding layer BM, about 19 μm according to the present embodiment. The shielding portion COM1 and the light shielding layer BM are arranged opposite each other.

The shielding portion COM1 is arranged in a layer under comb common electrodes CE1 and CE4 and the signal line SL. In the direction in which line extends, the opposite ends of the shielding portion COM1 are positioned between comb common electrode CE1 and comb pixel electrode PE1 and between comb common electrode CE4 and comb pixel electrode PE3, respectively. The shielding portion COM1 is at the same potential as that of the common electrode CE. When the shielding portion COM1 is arranged opposite the signal line SL, leakage electric fields from the signal line can be blocked. Furthermore, the vicinity of the signal line SL can be prevented from being exposed to light.

Here, in liquid crystal displays utilizing lateral fields, such as liquid crystal displays in the IPS mode, crosstalk may occur near the signal line SL because of the adverse effect of leakage electric fields from the signal line SL. Thus, if the shielding portion COM1 is arranged on the first substrate 101 opposite the signal line SL as described above in order to avoid degradation of display quality caused by the crosstalk, steps are formed over the ends of the shielding portion COM1.

An alignment film is applied to the surface of the first substrate 101, and the surface of the alignment film is aligned along a predetermined direction. However, if the direction of the alignment process intersects the ends of the shielding portion COM1, light may leak from the step portions of the first substrate 101 as a result of an inappropriate alignment process. This may reduce contrast and thus degrade display quality.

According to the present embodiment, the alignment film arranged on the surface of each of the first substrate 101 and the second substrate 102, said surface contacting the liquid crystal layer LQ, is aligned along the first direction D1. The direction D1 of this alignment process intersects the ends of the shielding portion COM1. Thus, for example, if a rubbing process is carried out as an alignment process, the direction of the rubbing may be disturbed in areas near the steps formed on the first substrate 101 along the ends of the shielding portion COM1 (areas A shown in FIG. 2). The steps on the shielding portion COM 1 are, for example, 0.3 μm. The disturbed rubbing direction may cause an initial alignment direction for liquid crystal molecules to deviate from the desired one. This may lead to light leakage, reducing the contrast.

Thus, according to the present embodiment, the light shielding layer BM is arranged on the second substrate 102 opposite the shielding portion COM1. The shielding portion COM1 and the light shielding layer BM are set to have a substantially equal width in the direction in which line III-III extends.

When the second substrate 102 and the first substrate 101 are laminated together, if the ends of the shielding portion COM1 coincide with the respective ends of the light shielding layer BM, the above-described arrangement enables crosstalk caused by the adverse effect of leakage electric fields from the signal line SL to be prevented from being viewed without reducing transmittance. Furthermore, if the ends of the shielding portion COM1 are displaced from the respective ends of the light shielding layer BM when the second substrate 102 and the first substrate 101 are laminated together, one of the areas A near the ends of the shielding portion COM1 in the second direction D2 lies opposite the light shielding layer BM. This allows a decrease in contrast to be suppressed more appropriately than in the case where the ends of the shielding portion COM1 coincide with the respective ends of the light shielding layer BM. Thus, the liquid crystal display according to the present embodiment allows the average contrast to be improved.

In the steps of manufacturing the liquid crystal display, even when the first substrate 101 and the second substrate 102 are laminated together after alignment, the substrates 101 and 102 may be slightly displaced from each other. Thus, the first substrate 101 and the second substrate 102 are formed with the allowable range of possible displacement taken into account. The present embodiment can provide a liquid crystal display which allows the average contrast to be improved as described above based on the allowable range of possible displacement and which achieves high display quality without reducing the transmittance even when the displacement does not occur. In addition, it is assumed that for example, the light shielding layer B is made narrower than the shielding portion COM1 in order to reduce a variation in transmittance associated with the allowable range of possible displacement. Then, if light leaks from the area near the end (step portion) of the shielding portion COM1, the light shielding layer BM fails to block light, resulting in a reduced contrast.

According to the present embodiment, the shielding portion COM1 and the light shielding layer BM are arranged so as to be bent along the signal line SL. Thus, even if the arrangement positions of the first substrate 101 and the second substrate 102 are displaced in the first direction D1, one of the areas A near the opposite ends of the shielding portion COM1 in the second direction D2 lies opposite the light shielding layer BM.

That is, the present embodiment can provide a liquid crystal display with high display quality.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Figure 4:
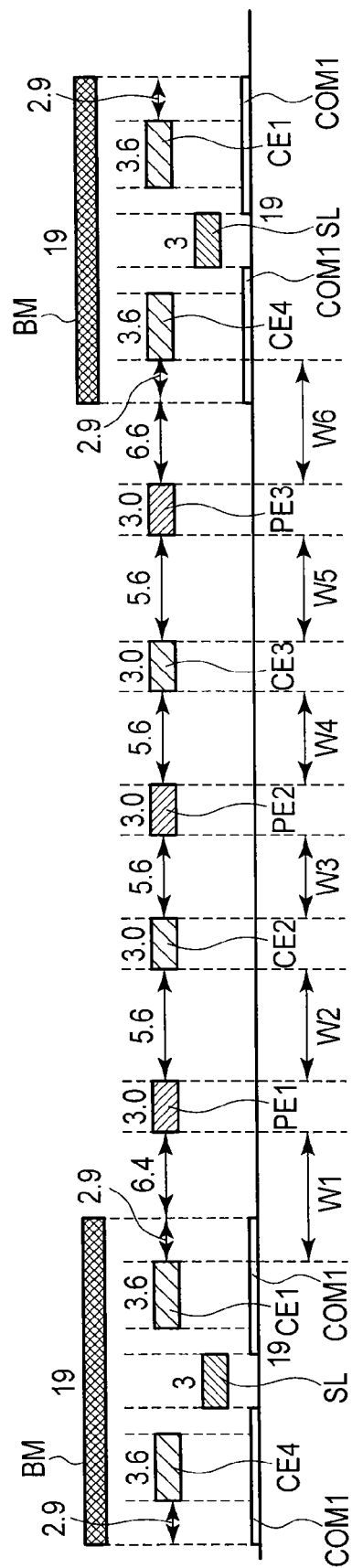
FIG. 4 is a diagram illustrating an example of a configuration of the display element in the liquid crystal display according to the embodiment.

FIG. 4 is a cross-sectional view illustrating an example of a configuration of the liquid crystal display 1 according to an embodiment.

For example, according to the above-described embodiment, the shielding portion COM1 is arranged opposite the signal line SL. However, as shown in FIG. 4, the shielding portion COM1 may at least be arranged between the signal line SL and comb pixel electrodes PE1 and PE3 located near the signal line. Thus, a portion of the shielding portion COM1 which lies opposite the signal line SL may be removed so that the remaining portions of the signal line SL are arranged on the respective opposite sides of the signal line SL. Even in that case, effects similar to those of the above-described embodiment can be exerted by setting the width of the light shielding layer BM substantially equal to the width of the combination of the removed portion of the shielding portion COM1 and the portions of the shielding portion COM1 arranged on the respective opposite sides of the signal line SL. Thus, the width of the shielding portion COM1 may be the width between an edge disposed near the comb pixel electrode of the shielding portion COM1 arranged on one side of the signal line SL and an edge disposed near the comb pixel electrode of the shielding portion COM1 arranged on another side of the signal line SL, in the direction in which line III-III extends.

What is claimed is:

1. A liquid crystal display comprising:
a first substrate comprising a scan line, a signal line intersecting the scan line, a pixel electrode including a plurality of comb pixel electrodes extending in a direction in which the signal line extends and arranged in a direction in which the scan line extends, a common electrode including a plurality of comb common electrodes extending between the plurality of comb pixel electrodes in a direction in which the signal line extends and arranged with a predetermined space between each comb common electrode and the adjacent comb pixel electrode, and a light shielding portion at least arranged between the signal line and a comb pixel electrode arranged neighboring the signal line in the direction in which the scan line extends;
a second substrate comprising a light shielding layer having a width identical to a width of the light shielding portion and arranged opposite the signal line, in a direction substantially orthogonal to a direction in which the signal line extends; and
a liquid crystal layer held between the first substrate and the second substrate,
wherein
the light shielding portion is a different layer than the comb common electrodes, and overlaps with both a comb common electrode and the signal line,
the light shielding portion is formed in a layer under the comb common electrodes and the signal line,
both ends of the light shielding portion are positioned between the comb common electrode and the comb pixel electrode, and
the light shielding portion and the comb common electrode are connected to each other by a contact hole.

2. The liquid crystal display according to claim 1, wherein the signal line, the comb pixel electrode, and the comb common electrode are all extend in a direction which intersects the scan line, so as to be bent.

3. The liquid crystal display according to claim 1, wherein a voltage identical to a voltage applied to the common electrode is applied to the light shielding portion.

4. The liquid crystal display according to claim 2, wherein a voltage identical to a voltage applied to the common electrode is applied to the light shielding portion.

5. The liquid crystal display according to claim 1, wherein each of the first substrate and the second substrate comprises an alignment film arranged on a surface of the substrate which contacts the liquid crystal layer and subjected to a process for alignment in a predetermined direction, and
the alignment film of the first substrate is subjected to the process for alignment in a direction which intersects the ends of the light shielding portion.

6. The liquid crystal display according to claim 2, wherein each of the first substrate and the second substrate comprises an alignment film arranged on a surface of the substrate which contacts the liquid crystal layer and subjected to a process for alignment in a predetermined direction, and
the alignment film of the first substrate is subjected to the process for alignment in a direction which intersects the ends of the light shielding portion.

7. The liquid crystal display according to claim 3, wherein each of the first substrate and the second substrate comprises an alignment film arranged on a surface of the substrate which contacts the liquid crystal layer and subjected to a process for alignment in a predetermined direction, and
the alignment film of the first substrate is subjected to the process for alignment in a direction which intersects the ends of the light shielding portion.

* * * * *